(12) United States Patent
Cheng

(10) Patent No.: US 6,553,154 B1
(45) Date of Patent: Apr. 22, 2003

(54) IMAGE READING APPARATUS

(75) Inventor: Chih-Ming Cheng, Yung-Ho (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/427,111

(22) Filed: Oct. 26, 1999

(30) Foreign Application Priority Data

Nov. 5, 1998 (TW) ......................................... 87118453 A

(51) Int. Cl.$^7$ ................................................ G06K 7/00
(52) U.S. Cl. ....................... 382/312; 382/313; 382/315; 346/74.2
(58) Field of Search ................................. 382/312, 313, 382/315, 320; 358/487, 475, 497, 506, 509, 403; 346/74.2

(56) References Cited

U.S. PATENT DOCUMENTS

| 4,750,003 A | * | 6/1988 | Terashima et al. | .......... | 346/74.2 |
| 5,367,382 A | * | 11/1994 | Bhatt et al. | .................. | 358/403 |
| 5,986,774 A | * | 11/1999 | Han | ............................ | 358/487 |
| 6,081,630 A | * | 6/2000 | Kaneko | ....................... | 382/313 |

FOREIGN PATENT DOCUMENTS

JP          04261261      *  9/1992      ............ H04N/1/31

* cited by examiner

Primary Examiner—Anh Hong Do
(74) Attorney, Agent, or Firm—Ladas & Parry

(57) ABSTRACT

Provided is a transparency scanner having a light source which is synchronously moved with the image sensor of the scanner by using magnetic force to establish a solid connection between the transparency scanning light source and the image sensor while scanning a transparency. A motor is used to synchronously move the transparency scanning light source and the image sensor to avoid the errors produced by driving devices such as different motors or gears, etc. Therefore, synchronous movement of the transparency scanning light source and the image sensor can be ensured, and the deterioration of the scanning quality due to various distributions of the intensity of the light source can also be avoided.

13 Claims, 3 Drawing Sheets

IMAGE READING APPARATUS

BACKGROUND OF THE INVENTION

1. Field of the Invention

This invention relates to an image reading apparatus. In particular, it relates to a flatbed scanner capable of reading a transparency. More particularly, it relates to a scanner having a light source which synchronously moves with the image sensor of the scanner.

2. Description of Prior Art

Flatbed scanners are generally used to scan an opaque sheet in a reflective manner. A lamp tube is used to illuminate the scanned object, and an optical system is used to collect and pass the reflected light to the image sensor. The light distributed on the scanned object is of the same intensity since the distance between the lamp tube and the scanned object is fixed while scanning. Further, since the distance between the image sensor and the scanned object is also fixed, the brightness of the image received by the image sensor is uniform along the scanning path. Regarding the variation of the gray level for the image along the direction of the lamp tube due to its uneven illumination, a correction sheet can be used to build a reference level of brightness before performing the scanning. Thus the signal detected by the image sensor for each pixel can be corrected while scanning so that the image sensor determines the amplitude of the signals based only on the variation of the gray level on the document and neglects the variation caused by the light source.

While the scanner scans a transparent sheet, a transparency kit is provided to provide a light source. The light emitted by the light source could pass through the transparent sheet and enters the optical system beneath the transparent sheet. Please refer to FIG. 1a and FIG. 1b. If the light emitted by the light source 12 is not uniform, the change of the relative position of the light source 12 and the image sensor 10 would make the light intensity detected by the image sensor 10 also changed. Therefore, the image sensor 10 and the light source 12 above the scanned document must move synchronously. If there is any discrepancy in the synchronous moving of the image sensor 10 and the light source 12, the scanning quality would deteriorate because the light intensity of the image distributed on the image sensor 10 varies, as shown in FIG. 1b.

Please refer to FIG. 2. For a scanner capable of reading a transparency, the scanner generally includes motors 14, 24 together with belts 16, 26 to move the lamp tubes 18, 28 which serve as the light sources for scanning an opaque object and a transparency respectively. The motor 14 driving the image sensor 20 and the motor 24 driving the light source of the transparency kit are respectively controlled to synchronously move the image sensor 20 and the light source 28. However, the motors 14, 24 might not run smoothly, the two motors 14, 24 might not move exactly synchronously to each other, and the gears driving the belts 16, 26 might not be perfect circles. These factors would make the relative position of the light source 28 and the image sensor 20 unlikely to be fixed. Therefore, the conventional scanner cannot provide a stable and good scanning quality while scanning a transparency.

SUMMARY OF THE INVENTION

Accordingly, to improve the drawbacks of the prior-art scanner, the object of this invention is to provide a transparency scanner having a light source which synchronously moves with the image sensor of the scanner. Such arrangement would be capable of preventing deterioration of the scanning quality due to the variation of light intensity from the light source.

To attain the above object, this invention does not use different motors to respectively drive the transparency scanning light source and the image sensor as in the conventional scanner. Instead, this invention provides a strong link between the light source and the image sensor to provide a conjunctive relation, and uses only one motor to move the transparency scanning light source and the image sensor synchronously. Thereby, errors caused by the driving devices such as different motors or gears, etc., are avoided.

In the invention, the link between the transparency scanning light source and the image sensor is realized by magnetic force. However, in place of magnetic force, other ways can be used, e.g., by means of mechanical link. Once a strong connection is established between the transparency scanning light source and the image sensor, the relative positions of the transparency scanning light source and the image sensor remains are fixed while scanning. Thus the intensity distribution of light detected by the image sensor is constant during scanning, so that the scanning quality is not adversely affected.

BRIEF DESCRIPTION OF THE DRAWINGS

The following detailed description will best be understood in conjunction with the accompanying drawings in which.

DETAILED DESCRIPTION OF THE PREFERRED EMBODIMENTS

Figure 1A:
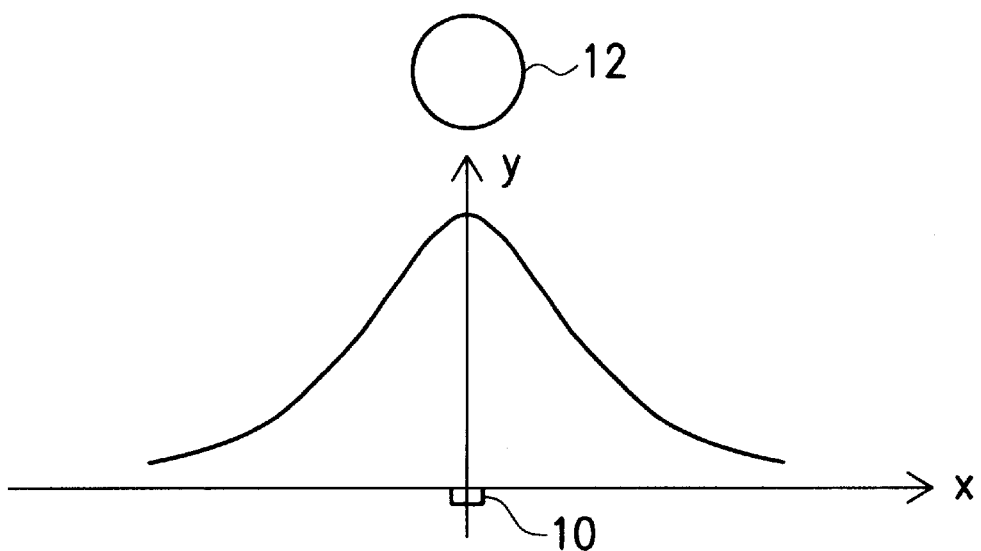
FIG. 1a and FIG. 1b illustrate the light intensity distribution on the moving surface of an image sensor for an uneven light source.
Figure 1B:
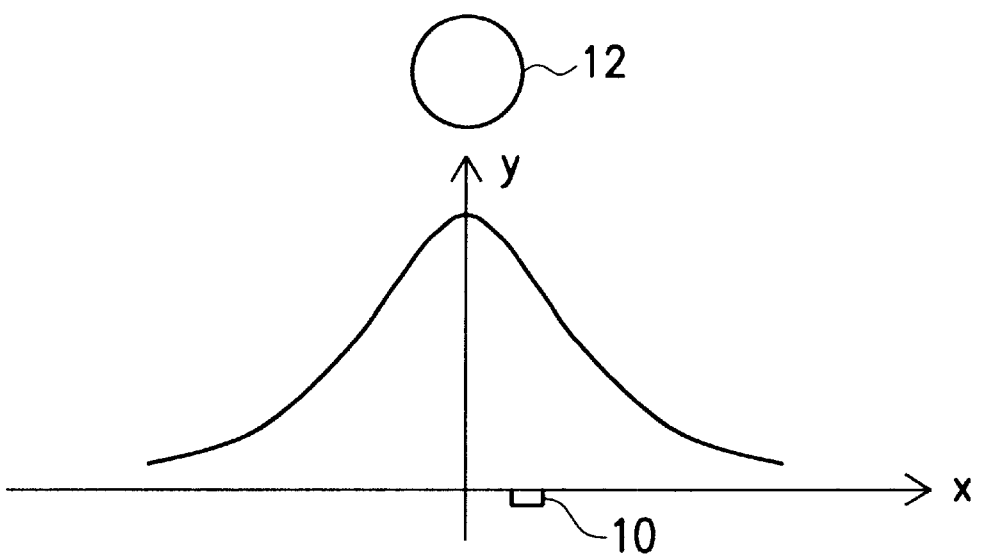
Figure 2:
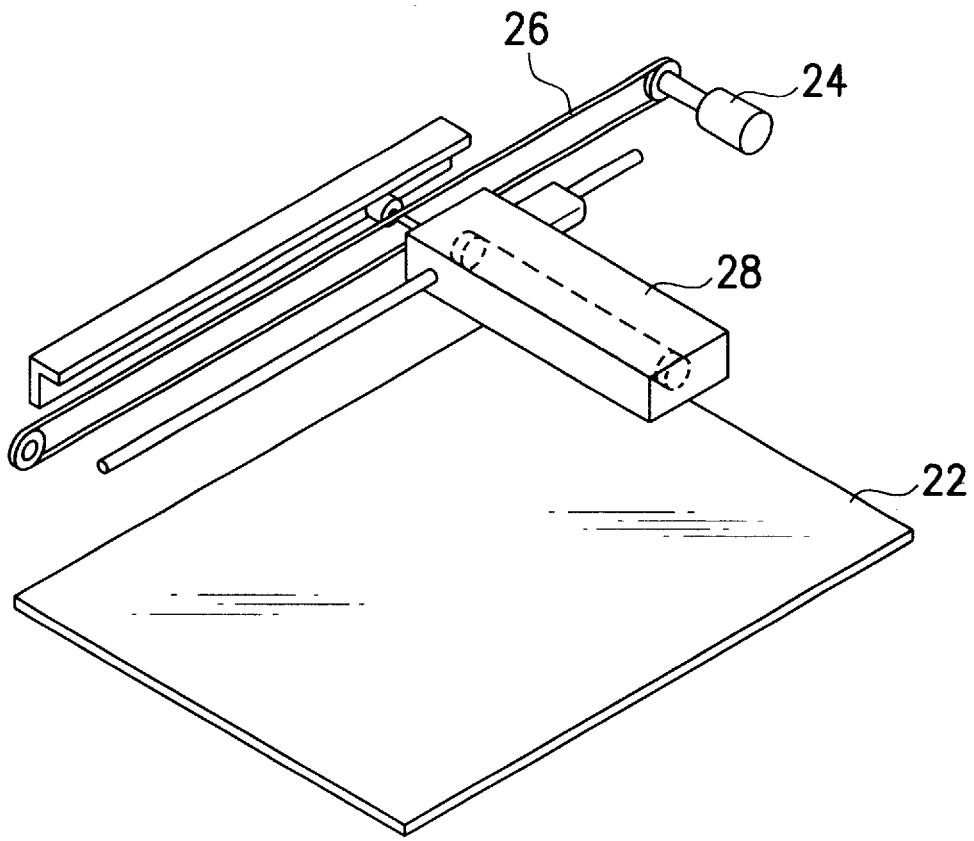
FIG. 2 is a diagram illustrating the structure of a conventional transparency scanner.
Figure 2:
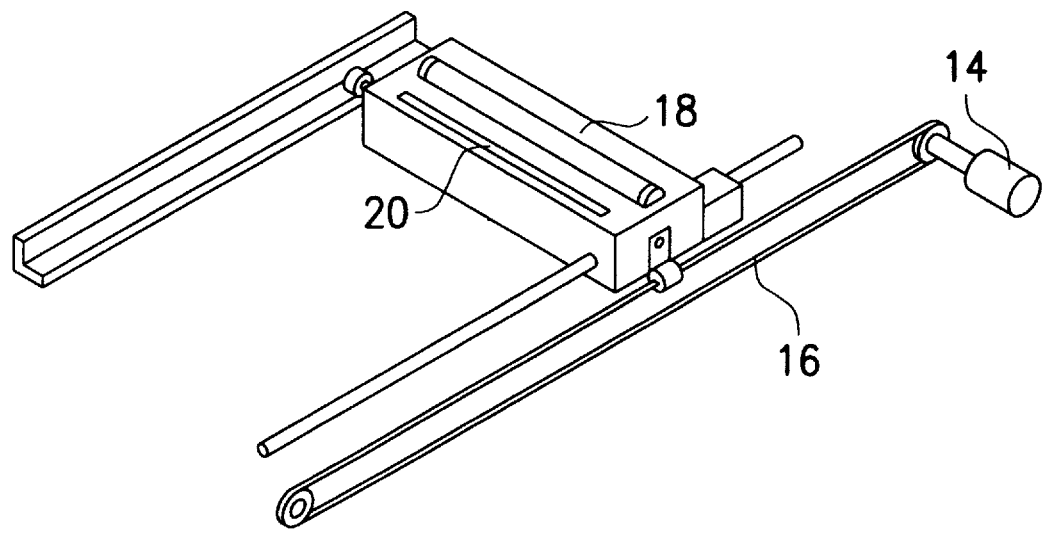
Figure 3:
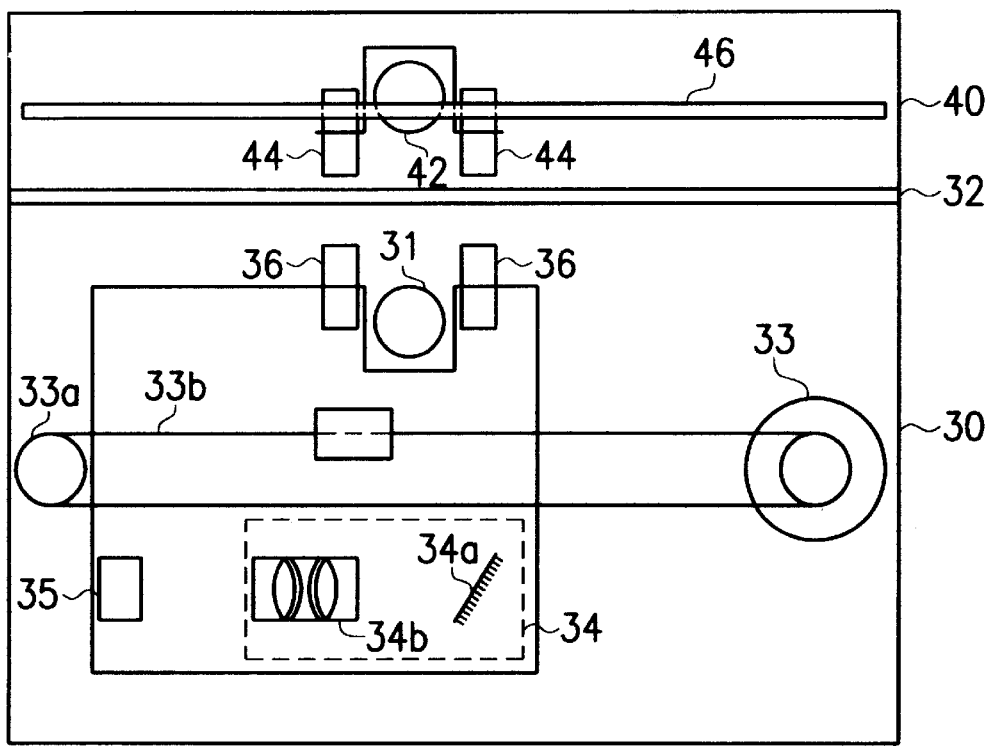
FIG. 3 is a diagram illustrating a transparency scanner having a light source which synchronously moves with the image sensor of the scanner according to one embodiment of this invention.

Please refer to FIG. 3. According to one embodiment of this invention, the transparency scanner includes a main body 30 and a transparency scanning kit 40, wherein the image sensor 35 in the main body 30 and the light source 42 in the transparency scanning kit 40 are strongly linked by magnetism.

As shown in FIG. 3, the main body 30 includes a scanning module and a transmission mechanism. The scanning module comprises a first light source 31, first magnetic devices 36, 36, an optical system 34, and an image sensor 35. The transmission mechanism comprises a driving device 33, a gear 33a, and a belt 33b, for driving the scanning module to move along a scanning path for reading image on the scanned object.

If the scanned object is opaque, the first light source 31 offers light needed to illuminate the opaque document. The optical system 34 collects the light emitted by the first light source 31 and reflected by the scanned object 32. The image sensor 35 receives the light collected by the optical system 34 and converts the light to corresponding electric signals representing the image on the scanned object. The first magnetic devices 36, 36 are disposed on the both ends of the first light source 31.

The transparency scanning kit 40 includes: a second light source 42 for providing the light needed to scan a transparency; second magnetic devices 44, 44 disposed at both ends of the light source 42, for being attracted to the first magnetic device 36, 36 so that a strong magnetic connection can be established between the second light source 42 and the image sensor 35 in the scanning module. In this way, the second light source 42 can moves synchronously with the image sensor 35 in the scanning module when the scanning module moves along a scanning path to scan the image on the scanned object.

In this embodiment, the first magnetic devices 36, 36 are two electromagnets disposed on both sides of the first light source 31. The first magnetic devices 36, 36 can be activated by electricity. When the scanner is not operating, the first magnetic devices 36, 36 have no (or few) magnetism. When the scanner is operating, the first magnetic devices 36, 36 will be activated by electricity and the second magnetic devices 44, 44 will be attracted to the first magnetic devices 36, 36. Thus a strong magnetic connection can be established between the second magnetic devices 44, 44 and the first magnetic devices 36,36.

Since in this embodiment the first magnetic devices 36, 36 are fixedly linked with the image sensor 35 and the second magnetic devices 44, 44 are fixedly linked with the second light source 42, the second light source 42 can move synchronously with the image sensor 35 when the scanner is scanning a transparency along a scanning path. Regarding the second pair of magnetic devices 44, they can be made of any material which could be attracted by magnetism. It is preferred that the first magnetic devices 36, 36 are made of magnet or electromagnet, and the second magnetic devices 44, 44 are made of any material that could be attracted by magnetism. Through this way, a strong connection between the first magnetic devices 36, 36 and the second magnetic devices 44, 44 can be established to insure that the second light source 42 moves synchronously with the image sensor 35. To achieve the best result, the first magnetic devices 36, 36 and the second magnetic devices 44, 44 are respectively disposed on corresponding positions and different sides of the scanning plate for containing a transparency, as shown in FIG. 3. In this embodiment, the first magnetic devices 33 and the second magnetic devices 44 are composed of two magnetic devices respectively. However, it should be noted that one magnetic device will suffice to achieve the goal of the present invention.

The lamp tubes used in a conventional scanner can be used as the first light source 31 and the second light source 42. The image sensor 35 is the same as in the general scanner, which can be a charge-coupled device (CCD) or other optical sensing device. The driving device 33 can be a step motor. The optical system 34 includes the mirror 34a and focusing device 34b, such as a lens or a lens set.

Figure 4:
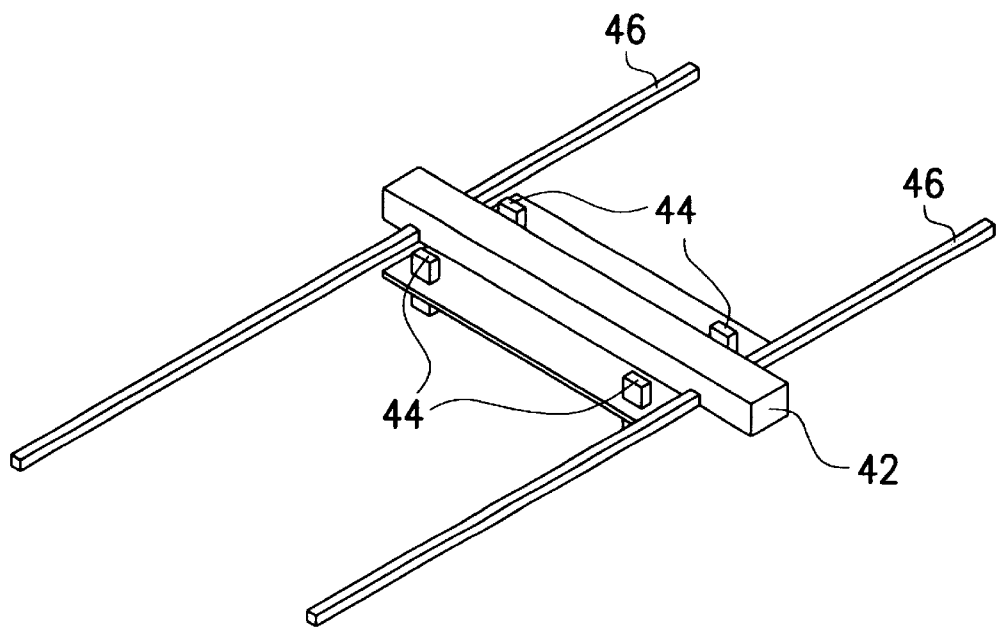
FIG. 4 is a diagram illustrating the structure of a transparency scanner according to one embodiment of this invention.

Additionally, referring to FIG. 4, the second light source 42 is installed on a pair of parallel sliding rails 46. The second light source 42 can freely move along the sliding rail 46. The friction between the light source 42 and the sliding rail 46 when the light source 42 is moving along the sliding rail 46 is quite little, so that the obstruction to the synchronous movement of the second light source 42 and the image sensor 35 can be minimized.

The strong link between the second light source 42 and the image sensor 35 is formed by magnetic force in this embodiment. However, in place of magnetic force, other means can be adopted, for example fixedly connecting the light sources by a physical mechanism.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An image reading apparatus for reading an image on a transparency, said image reading apparatus comprising:

a plate for supporting the transparency;

a lighting module, disposed at one side of said plate, comprising a light source for emitting light to the transparency and an electromagnet disposed on said lighting module, said electromagnet adapted to be selectively activated;

a scanning module, disposed at the other side of said plate, comprising an image sensor for receiving the light passing through the transparency, and converting the light to corresponding electric signals representing the image on the transparency;

wherein when said image reading apparatus is operated to read the transparency said electromagnet is activated to generate magnetism and said lighting module is attracted to said scanning module by said magnetism and moves along a scanning path synchronously with said scanning module, and when said image reading apparatus is not operated to read the transparency, said electromagnet is not activated.

2. An image reading apparatus as claimed in claim 1, wherein said lighting module further comprises a device attracted to said eletromagnet by magnetism when said electromagnet is activated and said scanning module moves along the scanning path.

3. An image reading apparatus as claimed in claim 2, any wherein said device is made of material that can be attracted by magnetism.

4. An image reading apparatus as claimed in claim 2, wherein said second device is a pair of magnets.

5. An image reading apparatus as claimed in claim 1, wherein said image sensor is a charge-coupled device (CCD).

6. An image reading apparatus as claimed in claim 1, wherein said light source is a lamp tube.

7. An image reading apparatus as claimed in claim 1, wherein said lighting module is installed on a pair of parallel sliding rails, said lighting module slides along said pair of parallel sliding rails synchronously with said scanning module when said scanning module moves along the scanning path.

8. An image reading apparatus for reading an image on a transparency, said image reading apparatus comprising:

a plate for supporting the transparency;

a lighting module, disposed at one side of said plate, comprising a light source for emitting light to the transparency;

an electromagnet, disposed on said lighting module, said electromagnet adapted to be selectively activated;

a scanning module, disposed at the other side of said plate, comprising an image sensor for receiving the light passing through the transparency, and converting the light to corresponding electric signals representing the image on the transparency;

a device, disposed on said scanning module;

wherein when said image reading apparatus is operated to read the image on the transparency, said electromagnet is activated to generate magnetism and said device is attracted to said electromagnet by magnetism so that said lighting module moves along a scanning path synchronously with said scanning module.

9. An image reading apparatus as claimed in claim 8, wherein said device is made of material that can be attracted by magnetism.

10. An image reading apparatus as claimed in claim 8, wherein said device is a pair of magnets.

11. An image reading apparatus as claimed in claim 8, wherein said image sensor is a charge-coupled device (CCD).

12. An image reading apparatus as claimed in claim 8, wherein said light source is a lamp tube.

13. An image reading apparatus as claimed in claim 8, wherein said lighting module is installed on a pair of parallel sliding rails, said lighting module slides along said pair of parallel sliding rails synchronously with said scanning module when said scanning module moves along the scanning path.

* * * * *

UNITED STATES PATENT AND TRADEMARK OFFICE
CERTIFICATE OF CORRECTION

PATENT NO.   : 6,553,154 B1
DATED        : April 22, 2003
INVENTOR(S)  : Chih-Ming Cheng It is certified that error appears in the above-identified patent and that said Letters Patent is hereby corrected as shown below:

<u>Title page,</u>
Item [73], should read as follows:
-- [73] Assignee: BenQ Corporation, Taoyuan (TW) --.

Signed and Sealed this

Second Day of September, 2003

JAMES E. ROGAN
*Director of the United States Patent and Trademark Office*